(12) United States Patent
Yang

(10) Patent No.: US 8,484,041 B2
(45) Date of Patent: *Jul. 9, 2013

(54) SYSTEM AND METHOD FOR REPUTATION SCORING

(71) Applicant: Edward Yang, La Puente, CA (US)

(72) Inventor: Edward Yang, La Puente, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/623,136

(22) Filed: Sep. 20, 2012

(65) Prior Publication Data

US 2013/0018814 A1   Jan. 17, 2013

Related U.S. Application Data

(63) Continuation-in-part of application No. 13/041,002, filed on Mar. 4, 2011.

(51) Int. Cl.
*G06Q 30/02* (2012.01)
*G06Q 10/10* (2012.01)
*G06Q 10/06* (2012.01)
*G06Q 30/06* (2012.01)
*G06Q 10/08* (2012.01)

(52) U.S. Cl.
USPC .............................. 705/1.1; 705/319; 705/347

(58) Field of Classification Search
None
See application file for complete search history.

(56) References Cited

U.S. PATENT DOCUMENTS

| | | | | |
|---|---|---|---|---|
| 7,822,631 | B1 * | 10/2010 | Vander Mey et al. | 705/7.29 |
| 2012/0130863 | A1 * | 5/2012 | Tedjamulia et al. | 705/27.1 |
| 2012/0311705 | A1 * | 12/2012 | Dixon et al. | 726/22 |

* cited by examiner

*Primary Examiner* — Jonathan Ouellette
(74) *Attorney, Agent, or Firm* — James M Smedley, LLC; James M Smedley, Esq.

(57) ABSTRACT

The present invention generally relates to online reputations. Specifically, this invention relates to a system and method for analyzing, determining, reporting and modifying an online reputation of a business, professional or individual. The online reputation of a business, professional or individual being comprised of a numeric value, calculated at least in part on positive reviews of the business, professional or individual, negative reviews of the business, professional or individual and the types of websites the positive or negative reviews reside upon.

18 Claims, 5 Drawing Sheets

| | Poor Review Link? | PR of Site | PR Weighting Penalty | Deduction | Actual Score | Max Possible Score |
|---|---|---|---|---|---|---|
| Google | | | | | | |
| *Page 1 - Position 1* | Yes | 6 | 0.7 | 21.56 | 9.24 | 30.8 |
| *Page 1 - Position 2* | No | | | | 11.9 | 11.9 |
| *Page 1 - Position 3* | YES | 3 | 0.5 | 4.55 | 4.55 | 9.1 |
| *Page 1 - Position 4* | YES | 4 | 0.5 | 0.7 | 0.7 | 1.4 |
| *Page 1 - Position 5* | YES | 10 | 1 | 1.4 | 0 | 1.4 |
| *Page 1 - Position 6* | No | | | | 1.4 | 1.4 |
| *Page 1 - Position 7* | No | | | | 1.4 | 1.4 |
| *Page 1 - Position 8* | No | | | | 1.4 | 1.4 |
| *Page 1 - Position 9* | No | | | | 1.4 | 1.4 |
| *Page 1 - Position 10* | No | | | | 2.8 | 2.8 |
| Page 2 - Position 1 | No | | | | 0.7 | 0.7 |
| Page 2 - Position 2 | No | | | | 0.7 | 0.7 |
| Page 2 - Position 3 | No | | | | 0.7 | 0.7 |
| Page 2 - Position 4 | No | | | | 0.7 | 0.7 |
| Page 2 - Position 5 | No | | | | 0.7 | 0.7 |
| Page 2 - Position 6 | No | | | | 0.7 | 0.7 |
| Page 2 - Position 7 | No | | | | 0.7 | 0.7 |
| Page 2 - Position 8 | No | | | | 0.7 | 0.7 |
| Page 2 - Position 9 | No | | | | 0.7 | 0.7 |
| Page 2 - Position 10 | No | | | | 0.7 | 0.7 |
| Total | | | | | 41.79 | 70 |
| Yahoo | | | | | | |
| Page 1 - Position 1 | Yes | 6 | 0.7 | 6.16 | 2.64 | 8.8 |
| Page 1 - Position 2 | No | | | | 3.4 | 3.4 |
| Page 1 - Position 3 | YES | 3 | 0.5 | 1.3 | 1.3 | 2.6 |
| Page 1 - Position 4 | YES | 4 | 0.5 | 0.2 | 0.2 | 0.4 |
| Page 1 - Position 5 | YES | 10 | 1 | 0.4 | 0 | 0.4 |
| Page 1 - Position 6 | No | | | | 0.4 | 0.4 |
| Page 1 - Position 7 | No | | | | 0.4 | 0.4 |
| Page 1 - Position 8 | No | | | | 0.4 | 0.4 |
| Page 1 - Position 9 | No | | | | 0.4 | 0.4 |
| Page 1 - Position 10 | No | | | | 0.8 | 0.8 |
| Page 2 - Position 1 | No | | | | 0.2 | 0.2 |
| Page 2 - Position 2 | No | | | | 0.2 | 0.2 |
| Page 2 - Position 3 | No | | | | 0.2 | 0.2 |
| Page 2 - Position 4 | No | | | | 0.2 | 0.2 |
| Page 2 - Position 5 | No | | | | 0.2 | 0.2 |
| Page 2 - Position 6 | No | | | | 0.2 | 0.2 |
| Page 2 - Position 7 | No | | | | 0.2 | 0.2 |
| Page 2 - Position 8 | No | | | | 0.2 | 0.2 |
| Page 2 - Position 9 | No | | | | 0.2 | 0.2 |

Fig. 4A

| | | | | | | |
|---|---|---|---|---|---|---|
| Page 2 - Position 10 | No | | | | 0.2 | 0.2 |
| Total | | | | | 11.94 | 20 |
| Bing | | | | | | |
| Page 1 - Position 1 | Yes | 6 | 0.7 | 3.08 | 1.32 | 4.4 |
| Page 1 - Position 2 | No | | | | 1.7 | 1.7 |
| Page 1 - Position 3 | YES | 3 | 0.5 | 0.65 | 0.65 | 1.3 |
| Page 1 - Position 4 | YES | 4 | 0.5 | 0.1 | 0.1 | 0.2 |
| Page 1 - Position 5 | YES | 10 | 1 | 0.2 | 0 | 0.2 |
| Page 1 - Position 6 | No | | | | 0.2 | 0.2 |
| Page 1 - Position 7 | No | | | | 0.2 | 0.2 |
| Page 1 - Position 8 | No | | | | 0.2 | 0.2 |
| Page 1 - Position 9 | No | | | | 0.2 | 0.2 |
| Page 1 - Position 10 | No | | | | 0.4 | 0.4 |
| Page 2 - Position 1 | No | | | | 0.1 | 0.1 |
| Page 2 - Position 2 | No | | | | 0.1 | 0.1 |
| Page 2 - Position 3 | No | | | | 0.1 | 0.1 |
| Page 2 - Position 4 | No | | | | 0.1 | 0.1 |
| Page 2 - Position 5 | No | | | | 0.1 | 0.1 |
| Page 2 - Position 6 | No | | | | 0.1 | 0.1 |
| Page 2 - Position 7 | No | | | | 0.1 | 0.1 |
| Page 2 - Position 8 | No | | | | 0.1 | 0.1 |
| Page 2 - Position 9 | No | | | | 0.1 | 0.1 |
| Page 2 - Position 10 | No | | | | 0.1 | 0.1 |
| Total | | | | | 5.97 | 10 |
| | | | | Weighted Score: | 47.76 | 80 |

Fig. 4B

| PR Rank | PR Rank Weighting |
|---|---|
| 10 | 1 |
| 9 | 0.9 |
| 8 | 0.9 |
| 7 | 0.9 |
| 6 | 0.7 |
| 5 | 0.7 |
| 4 | 0.5 |
| 3 | 0.5 |
| 2 | 0.3 |
| 1 | 0.3 |
| 0 | 0.3 |

| Score | |
|---|---|
| 75 - 80 | Excellent |
| 65 to 74 | Above Average |
| 51 to 64 | Below Average |
| 10 to 50 | Poor |

Fig. 4C

SYSTEM AND METHOD FOR REPUTATION SCORING

FIELD OF THE INVENTION

The present invention generally relates to online reputations. Specifically, this invention relates to a system and method for analyzing, determining, reporting and modifying an online reputation of a business, professional or individual. The online reputation of a business, professional or individual being comprised of a numeric value, calculated at least in part on positive reviews of the business, professional or individual, negative reviews of the business, professional or individual and the types of websites the positive or negative reviews reside upon.

CROSS REFERENCE TO RELATED APPLICATIONS

This application claims the benefit of U.S. patent application Ser. No. 13/041,002 filed Mar. 4, 2011, the entire disclosure of which is incorporated herein by reference.

BACKGROUND OF THE INVENTION

Today's economy is growing more and more dependent on e-commerce, online transactions and online presences. In large part, the world now requires entities (e.g., professionals, businesses, individuals, politicians, non-profit organizations) to have an online presence. Even where entities have their own online identity, these identities are augmented by an always growing portfolio of data surrounding the entity. For instance, each transaction, purchase, interaction with customer support or other event is likely to be noted, most likely permanently, on one or more spaces on the Internet.

The Internet is comprised of thousands of sites where customers may rate entities, rank entities, comment on transactions and experiences they have had with entities and more. Each of these interactions may be viewable by an entity's potential customers, clients, family members, employers or other third party. Positive and negative alike, every interaction is a fixture that the entity may or may not be able to affect.

One major issue is that there is no way currently for a business or a consumer to get an overall rating of a particular entity. The only way currently for a business or consumer to get an overview of a particular entity is to scour through potentially hundreds or thousands of web pages looking at reviews and comments about the particular entity. This can be time consuming and inaccurate as the top results of the particular ntity may be skewed one way (e.g., overly positive, overly negative, overly neutral) while more relevant results may be harder to find.

In any event, if a customer or business wanted to find out the total overall reputation for a particular entity, especially large entities which may have hundreds of thousands or millions of interactions available on the Internet, the process would be ultimately be impossible.

Another problem with the current state of the art is that even when a customer or business is able to get a rating of a particular entity, there is no way to know if the particular entity's ratings are trending in any particular direction. Most rating systems in use today only provide overall rankings or ratings, not trending information. This information may be particularly useful for entity's with imperfect ratings or rankings. If trending information showed a 4 out of 5 star business had improved its ratings drastically over the past few weeks/months/years, a customer may be more inclined to enter into a transaction with that entity.

Since there is no way in the current state of the art to identify a business's online reputation, entities have a hard time identifying areas of particular weaknesses in their online reputation. Without being able to identify the weaknesses in an entity's online reputation, it is nearly impossible to make a focused and effective effort to improve an entity's overall online reputation.

Therefore, there is a need in the art for a system and method for providing an overall online reputation score to a user, potentially including reputation trending data points, and present recommendations on how to modify the overall online reputation score. These and other features and advantages of the present invention will be explained and will become obvious to one skilled in the art through the summary of the invention that follows.

SUMMARY OF THE INVENTION

The present invention provides users a single networked platform for the determination and analysis of online reputations of businesses, individuals, professionals or other entities (collectively referred to as "entities" or "entity"). This includes the ability to recommend particular actions that may be taken to modify the online reputation of such entities. The platform uniquely combines one or more modules for analyzing and extracting data points that may affect an entity's online reputation from one or more of search engine results, e-commerce site ratings/rankings and social media platforms.

According to an embodiment of the present invention, a server component may provide functionality for utilization of said one or more modules across one or more networks. Additionally, the server component may provide functionality for one or more users to access an online business reputation based at least in part on data received from the one or more modules. Prior to transmitting said online business reputation to said one or more users, the system herein described may generate reports based at least in part on online business reputation and determine recommendations on how to modify said online business reputation. Said reports may be transmitted to said one or more users where desired/requested.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

BRIEF DESCRIPTION OF THE DRAWINGS

FIG. 4A is a first page of a table showing an online reputation scoring report in accordance with an embodiment of the present invention;

FIG. 4B is a second page of a table showing an online reputation scoring report in accordance with an embodiment of the present invention; and FIG. 4C is a third page of a table showing an online reputation scoring report in accordance with an embodiment of the present invention.

DETAILED SPECIFICATION

The present invention generally relates to online reputations. Specifically, this invention relates to a system and method for analyzing, determining, reporting and modifying an online reputation of a business, professional or individual. The online reputation of a business, professional or individual being comprised of a numeric value, calculated at least in part on positive reviews of the business, professional or individual, negative reviews of the business, professional or individual and the types of websites the positive or negative reviews reside upon.

According to an embodiment of the present invention, the system and method is accomplished through the use of one or more computing devices. One of ordinary skill in the art would appreciate that a computing device appropriate for use with embodiments of the present application may generally be comprised of one or more of a Central Processing Unit (CPU), Random Access Memory (RAM), and a storage medium (e.g., hard disk drive, solid state drive, flash memory). Examples of computing devices usable with embodiments of the present invention include, but are not limited to, personal computers, smart phones, laptops, mobile computing devices, and servers. One of ordinary skill in the art would understand that any number of computing devices could be used, and embodiments of the present invention are contemplated for use with any computing device.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network, however a user may be able to compose data offline that will be consumed by the system when the user is later connected to a network.

Figure 1:
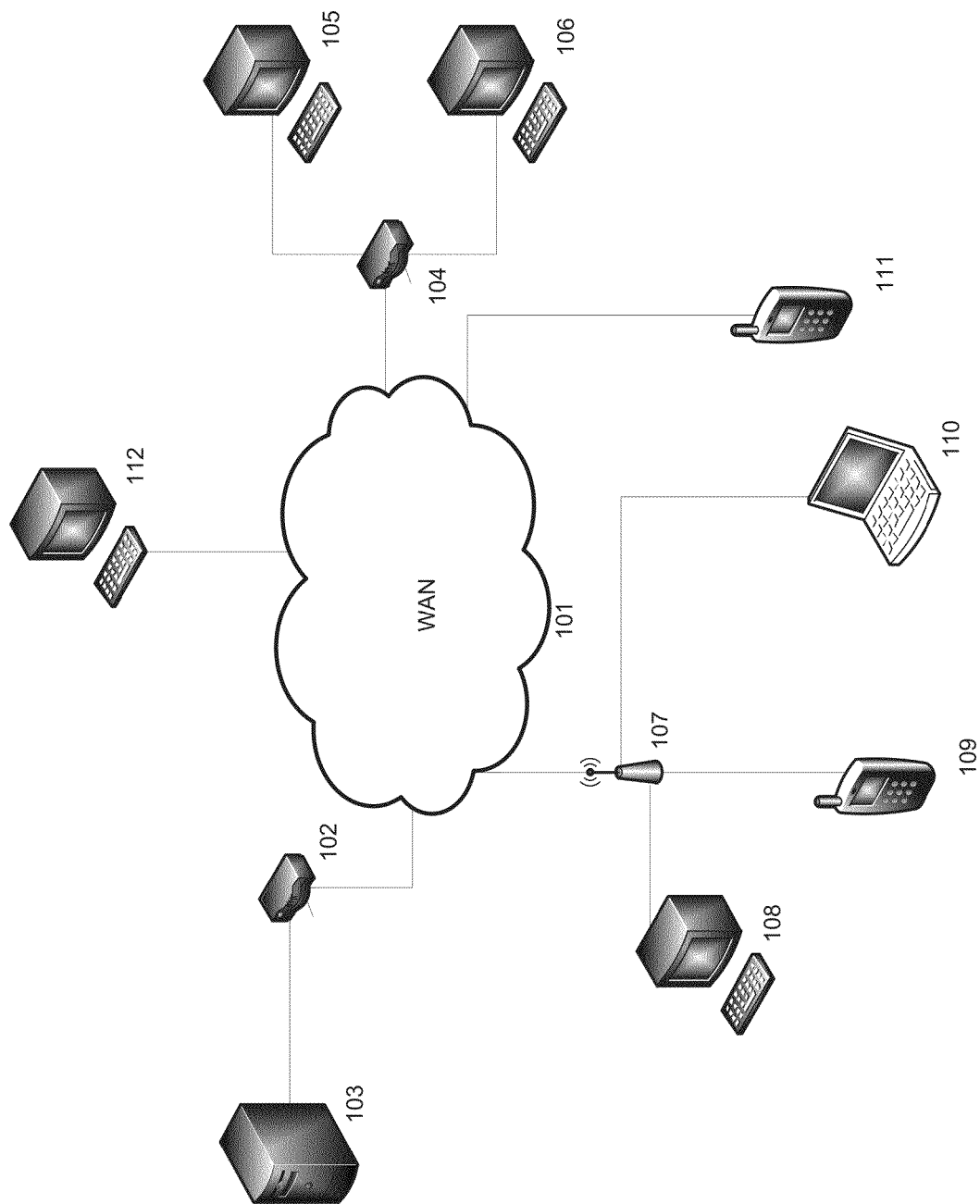
FIG. 1 is a schematic overview of a network system for carrying out this invention in accordance with an embodiment of the present invention.

Referring to FIG. 1, a schematic overview of a system in accordance with an embodiment of the present invention is shown. The system is comprised of one or more application servers 103 for electronically receiving, processing and storing information used by the system. Modules in the server 103 may retrieve and manipulate information in storage devices and exchange information through a WAN 101 (e.g., the Internet).

According to an exemplary embodiment, as shown in FIG. 1, exchange of information through the WAN 101 or other network may occur through one or more high speed connections directed through one or more routers 102. Router(s) 102 are completely optional and other embodiments in accordance with the present invention may or may not utilize one or more routers 102. One of ordinary skill in the art would appreciate that there are numerous ways server 103 may connect to WAN 101 for the exchange of information, and embodiments of the present invention are contemplated for use with any method for connecting to networks for the purpose of exchanging information.

Users may connect to server 103 via WAN 101 or other network in numerous ways. For instance, a user may connect to the system i) through a computing device 112 directly connected to the WAN 101, ii) through a computing device 105, 106 connected to the WAN 101 through a routing device 104, iii) through a computing device 108, 109, 110 connected to a wireless access point 107 or iv) through a computing device 111 via a wireless connection (e.g., CDMA, GMS, 3G, 4G) to the WAN 101. One of ordinary skill in the art would appreciate that there are numerous ways that a user may connect to Server 103 via WAN 101 or other network, and embodiments of the present invention are contemplated for use with any method for connecting to Server 103 via WAN 101 or other network.

According to an embodiment of the present invention, an individual or organization may signup to become a user of the system herein provided. In an exemplary embodiment, an individual or organization would go through a registration process, whereby they would provide identifying information to be stored in application server 103. This identifying information may be used, for instance, to identify the user, secure their login or process financial transactions. One of ordinary skill in the art would appreciate there are numerous ways to provide and manage registration processes, and embodiments of the present invention are contemplated for use with any method for providing and managing registration processes.

Figure 2:
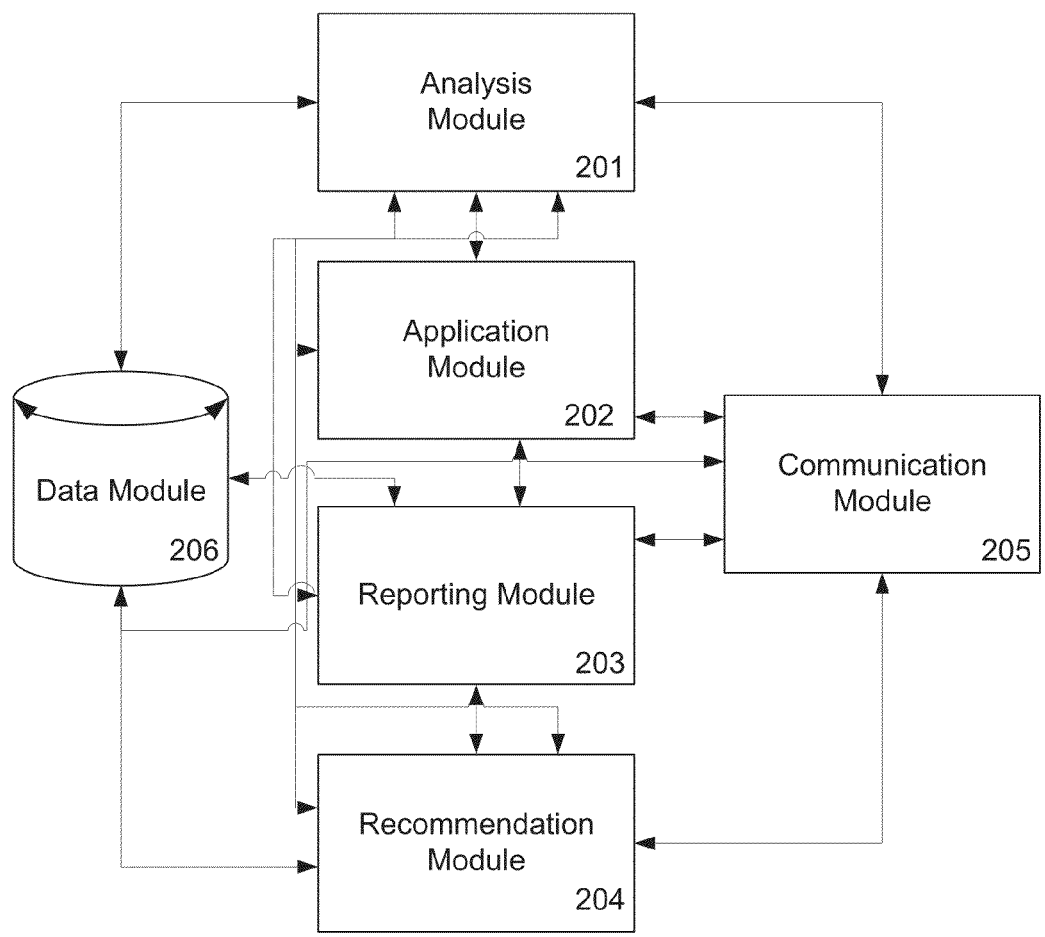
FIG. 2 is a schematic of a system in accordance with an embodiment of the present invention.

Turning now to FIG. 2, an exemplary embodiment of a system in accordance with an embodiment of the present invention, is described. In this embodiment, the system is comprised of an analysis module 201, an application module 202, a reporting module 203, a recommendation module 204, a communication module 205 and a data module 206. One of ordinary skill in the art would appreciate that these modules could be located on a single computing device or multiple computing devices communicatively connected to one another.

According to an embodiment of the present invention, an analysis module 201 provides functionality to the system for analyzing online systems for interactions pertaining to one or more entities. Online systems include, but are not limited to, websites, search engines, e-commerce sites, blogs, social network platforms, new media platforms, RSS feeds and business review sites. Interactions include, but are not limited to, ratings, reviews, blog posts, news posts, tweets, social network comments, page ranking statistics and business bureau results. One of ordinary skill in the art would appreciate that there are numerous online systems and interactions that could be analyzed by an analysis module 201 in accordance with an embodiment of the present invention, and embodiments of the present invention are contemplated for use with any type of online entity and interaction.

According to an embodiment of the present invention, an analysis module 201 may be configured to request and receive information from one or more of a communication module 205 and/or a data module 206. Typically, the analysis module 201, in conjunction with the one or more communication modules 205, searches numerous online systems for interactions related to a particular entity. Optionally, the analysis module 201, may also search information stored at one or more data modules 206 for previously stored interactions related to a particular entity.

According to an embodiment of the present invention, an analysis module 201 is configured to analyze interactions for their quality and type. For instance, an analysis module 201 may be configured to identify whether a particular interaction is a positive interaction (e.g., good review of an entity) or a negative interaction (e.g., a bad review of an entity). The analysis module 201 may be further configured to weight the importance of a particular interaction. For example, an analysis module 201 may weight an interaction found on various websites differently based on, for instance, the difficulty of removing or changing a negative review. One of ordinary skill in the art would appreciate that there are numerous ways for an interaction to be weighted, and embodiments of the present invention are contemplated for use with any method for weighting interactions.

According to an embodiment of the present invention, an application module 202 may be utilized to manage a user's experience with the system. The application module 202 may be configured to allow users to login, request online reputation scores for one or more entities, requests reports related to one or more entities, make financial transactions related to membership fees and other actions common to modules for managing user experience.

According to an embodiment of the present invention, a reporting module 203 may be utilized to generate reports related to one or more online reputation scores. In order to generate reports, the reporting module 203 may receive information from one or more of a analysis module 201, an application module 202, a recommendation module 204, a communications module 205, and a data module 206. Reports may include, but are not limited to, a current online reputation score, historical online reputation scores, trending information related to one or more online reputation scores, trending information comparing trends related to two or more entities, recommendations related to historical online reputation scores, recommendations related to current online reputation scores and recommendations related to desired online reputation scores.

According to an embodiment of the present invention, a reporting module 203 may be configured to provide reports to users in one or more formats. Report formats include, but are not limited to, Word documents, text documents, PDFs, XML, JSON, e-mail, HTML, PowerPoint, Excel and comma-separated values (CSV). The reports may also be provided via one or more application programming interfaces (API) to be consumed by third-party applications. Advantageously, through the use of APIs, reports generated by the systems and methods herein described may be provided to and consumed by users of third-party systems.

According to an embodiment of the present invention, a recommendation module 204 may be utilized to make specific and general recommendations to users based on analyzed interactions provided by an analysis module 201. In this manner, entities may be provided with more than just an online reputation score. Advantageously, the system and methods herein described may not only allow entities to know how they are viewed in the public, but take actions to improve their online reputation score.

According to an alternative embodiment of the present invention, a recommendation module 204 may be utilized to make specific and general recommendations to users on how to lower an online reputation score. While most typically, the system and methods herein described will be utilized to improve an online reputation score, recommendations may also be provided for lowering an online reputation score. For example, an entity may wish to take actions to lower the online reputation score of another entity. In this manner, the recommendation module 204 could provide recommendations on how to effectively reduce the other entity's online reputation score.

According to an embodiment of the present invention, a communication module 205 may be utilized to handle communications to and from the systems herein described. Communication modules 205 may be comprised of a mixture of hardware and software and designed to interconnect one or more computing devices to one or more of a LAN or WAN. The communication module 205, may be an integrated part of the system herein described or communicatively connected in a manner to allow for attachment and detachment at will.

According to an embodiment of the present invention, a data module 206 may be utilized to handle storage of relevant information to be used by the systems herein described. Data module 206 may be comprised of a mixture of hardware and software designed to allow for the temporary or permanent storage of data to be accessed by a system. Data modules 206 include, but are not limited to databases, storage mediums and random access memory.

According to an embodiment of the present invention, analysis module 201 is communicatively connected to one or more of an application module 202, a reporting module 203, a recommendation module 204, a communications module 205 and a data module 206.

According to an embodiment of the present invention, application module 202 is communicatively connected to one or more of an analysis module 201, a reporting module 203, a recommendation module 204, a communications module 205 and a data module 206.

According to an embodiment of the present invention, reporting module 203 is communicatively connected to one or more of an analysis module 201, an application module 202, a recommendation module 204, a communications module 205 and a data module 206.

According to an embodiment of the present invention, recommendation module 204 is communicatively connected to one or more of an analysis module 201, an application module 202, a reporting module 203, a communications module 205 and a data module 206.

According to an embodiment of the present invention, communication module 205 is communicatively connected to one or more of an analysis module 201, an application module 202, a reporting module 203, a recommendation module 204 and a data module 206.

According to an embodiment of the present invention, data module 206 is communicatively connected to one or more of an analysis module 201, an application module 202, a reporting module 203, a recommendation module 204, a communications module 205.

Figure 3:
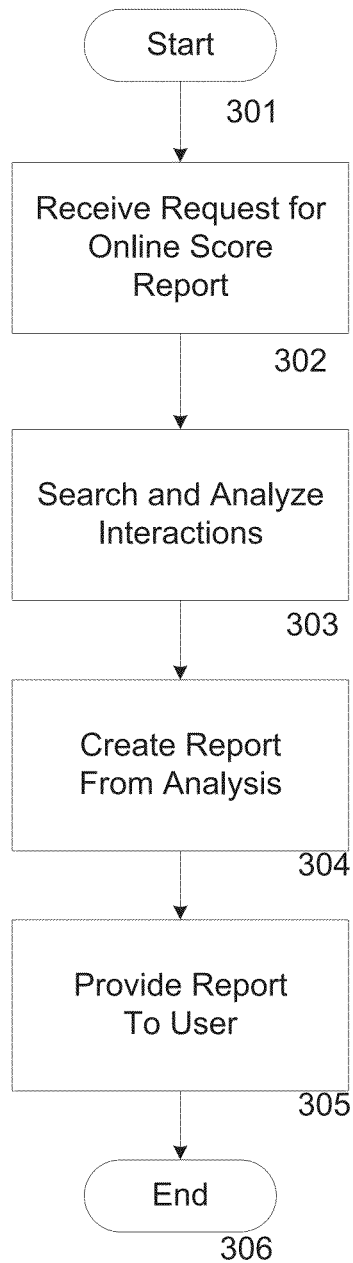
FIG. 3 is a flowchart describing an exemplary process in accordance with an embodiment of the present invention.

Turning now to FIG. 3, an exemplary process in accordance with the present invention is shown. The process starts at step 301, when a user logs into the system. The user may log in via an application module 202 provided by the system.

At step 302, the user sends to the system a request for an analysis and report of an online reputation score of a particular entity. Typically, this sort of request will be made over a network to the system which is located remotely from the user's computing device. For instance, this request may be received at a website contacted by the user utilizing a computing device connected to the Internet. The request may be received, for instance, at a communications module 205 of the system.

At step 303, the request is sent to an analysis module 201 for processing. At this point, the analysis module 201 may perform a search of one or more networks and storage mediums for interactions related to an entity. The analysis module 201 will review and rank/rate each interaction individually and generate an online reputation score based on predetermined algorithms for reviewing and weighting various interactions.

According to an embodiment of the present invention, Particular searches may be configured to suit the needs of a particular user. For instance, some users may only desire to have a standard search performed. A standard search may limit itself to only the first few dozen results returned. Other users may require in depth searches, requiring the search and analysis of various levels of interactions, no matter how remote. The more in depth the search, the more resources will be utilized and the more time or processing power may be consumed in order to generate the appropriate analysis of the interactions.

Once the analysis is complete, the process moves to step 304 at which point the system begins to generate a report based on the analysis provided from the analysis module 201. Optionally, the system may choose to store certain interactions and analyses identified and performed in step 303 in one or more data modules 206 to be utilized in future analysis and reports.

According to an embodiment of the present invention, prior to generating a report based on the analysis, the analysis data may be passed to one or more recommendation modules 204. The one or more recommendation modules 204 may utilize the analysis data to generate one or more recommendations on how to modify the analyzed online reputation score. The one or more recommendation modules 204 may be configured in such a manner as to only provide recommendations that may be pertinent to the particular user's goals. For instance, a user who has been identified as a small business may not be presented a recommendation to hire an expensive public relations firm in order to improve their online reputation score. Once the appropriate recommendations have been identified, the recommendation information may be sent to the reporting module 203 for addition in the report to be generated for the user.

At step 305, the generated report is transmitted from the reporting module 203 to the user, via the communications module 205. The report may be transmitted in any of the previously described manners, including transmittal through the use of an API for consumption by third-party services prior to being received by the user.

The process ends at step 306, with the user receiving the requested online reputation score report. The previous steps are merely for example purposes. The steps are not required to be executed in this order, and one of ordinary skill in the art would appreciate that these steps could be executed in a variety of different manners as well as having two or more of the steps executing simultaneously.

Turing now to FIGS. 4A-4C, a table is shown that represents an online reputation score report in accordance with an embodiment of the present invention. The online reputation score report in this embodiment is comprised of numerous weighted rankings of entities based in part upon their position, type and origin. The final score is weighted to fit a scale of 10-80 points. Once the final score has been weighted, the report may be provided to the user and also present a breakdown of how good their score is (e.g., 75-80 is excellent, 65-74 is above average, 51-64 is below average and 10-50 is poor).

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A method for providing an online reputation score, said method comprising:
   receiving, at an application server, a request from a user for information related to a first entity, said first entity comprising an individual, professional, or business;
   identifying, at said application server, said first entity;
   searching, utilizing said application server, a plurality of online systems for one or more interactions related to said first entity;
   analyzing, at said application server, said one or more interactions related to said first entity to form an online reputation score;

determining, at said application server, one or more recommendations on how to modify said online reputation score based at least in part on said one or more interactions;

creating, at said application server, an online reputation report based at least in part on said one or more recommendations and said online reputation score; and providing, from said application server, to said user, said online reputation report.

2. The method of claim 1, wherein at least one of said plurality of online systems is a search engine.

3. The method of claim 1, wherein at least one of said plurality of online systems is a social media platform.

4. The method of claim 1, wherein at least one of said plurality of online systems is an e-commerce website.

5. The method of claim 1, wherein at least one of said one or more interactions is an entity review.

6. The method of claim 1, wherein at least one of said one or more interactions is a customer review.

7. The method of claim 1, wherein at least one of said one or more interactions is a forum post.

8. The method of claim 1, wherein at least one of said one or more interactions is a social media communication.

9. The method of claim 1, wherein at least one of said one or more recommendations is an optimization based in part on search engine ranking results.

10. The method of claim 1, wherein at least one of said one or more recommendations is a recommendation to respond to one or more of said one or more interactions.

11. A system for providing an online reputation score, the system comprising:

an application module, wherein said application module is configured to receive a request for an online reputation score from a user, wherein said online reputation score pertains to a first entity, said first entity comprising an individual, professional, or business;

an analysis module communicatively connected to said application module, wherein said analysis module is configured to search and analyze a plurality of online systems for one or more interactions related to said first entity; and a reporting module communicatively connected to said analysis module and said application module, wherein said reporting module is configured to generate a report comprised of an online reputation score, wherein said report is based, at least in part, on information received from said analysis module;

a recommendation module communicatively connected to said application module, said analysis module and said reporting module, wherein said recommendation module is configured to provide recommendations to said reporting module, further wherein said recommendations are comprised of one or more recommendations on how to modify said online reputation score.

12. The system of claim 11, wherein at least one of said plurality of online systems is a search engine.

13. The system of claim 11, wherein at least one of said plurality of online systems is a social media platform.

14. The system of claim 11, wherein at least one of said plurality of online systems is an e-commerce website.

15. The system of claim 11, wherein at least one of said one or more interactions is an entity review.

16. The system of claim 11, wherein at least one of said one or more interactions is a customer review.

17. The system of claim 11, wherein at least one of said one or more interactions is a forum post.

18. The system of claim 11, wherein at least one of said one or more interactions is a social media communication.

* * * * *